United States Patent [19]

Radcliffe

[11] Patent Number: 5,067,670
[45] Date of Patent: Nov. 26, 1991

[54] FLIGHT TRAINING DEVICE FOR AIRCRAFT

[76] Inventor: Michael Radcliffe, 720 Ranas St., Elko, Nev. 89801

[21] Appl. No.: 564,066

[22] Filed: Aug. 8, 1990

[51] Int. Cl.⁵ .................... B60K 37/06; B62D 25/14
[52] U.S. Cl. ........................................ 244/119; 180/90
[58] Field of Search ................ 244/119, 129.1, 1 R, 244/229; 434/41, 258, 36; 73/431; 116/302; 180/60

[56] References Cited

U.S. PATENT DOCUMENTS 4,924,957 5/1990 Gigla .................................. 180/90

Primary Examiner—Joseph F. Peters, Jr.
Assistant Examiner—Virna Lissi Mojica
Attorney, Agent, or Firm—Pollock, Vande Sande & Priddy

[57] ABSTRACT

A device for controlling the visibility of an instrument in an instrument panel of an aircraft. The device is a dome-like structure capable of fitting over one instrument and having an opening in one side for viewing from that side.

6 Claims, 1 Drawing Sheet

FLIGHT TRAINING DEVICE FOR AIRCRAFT

FIELD OF THE INVENTION

This invention relates in general to devices for use in flight training, and more specifically, to devices for simulating failure of aircraft instruments.

BACKGROUND OF THE INVENTION

Aircraft instrumentation enables pilots to fly aircraft under conditions of poor visibility. In view of the importance of instruments, devices have been developed for simulating flight conditions of poor or no visibility in order to train a pilot in instrument landing and flight procedures. However, instruments can fail and it is important for a pilot to be able to fly safely insofar as possible upon instrument failure. Therefore, practice under conditions of simulated instrument failure is an important part of flight training. The various instruments have different susceptibilities to failure, and it is not unusual for only one of a group of instruments to fail at one time. It would therefore be desirable to be able to simulate a realistic situation involving failure of one or more instruments during flight training and to do it safely.

SUMMARY OF THE INVENTION

It is accordingly one object of this invention to provide a device capable of safely simulating the failure of one or more individual instruments on an instrument panel of an aircraft.

It is another object to provide a device for simulating the failure of one or more instruments on an aircraft instrument panel which will obstruct the view of a pilot trainee while permitting a flight instructor to view the instruments. In accordance with this invention, there has been provided a device for covering an individual instrument dial on an instrument panel of an aircraft, said device comprising: an annular planar base adapted to be mounted over an individual instrument on an aircraft instrument panel; a dome-like body having a planar lower rim affixed to said base, said dome-like body having an opening on a lateral side, said opening having a sufficiently large projected area to permit viewing substantially the entire inner circumferential portion of the base from a position adjacent the opening.

DETAILED DESCRIPTION OF THE INVENTION

Figure 1:
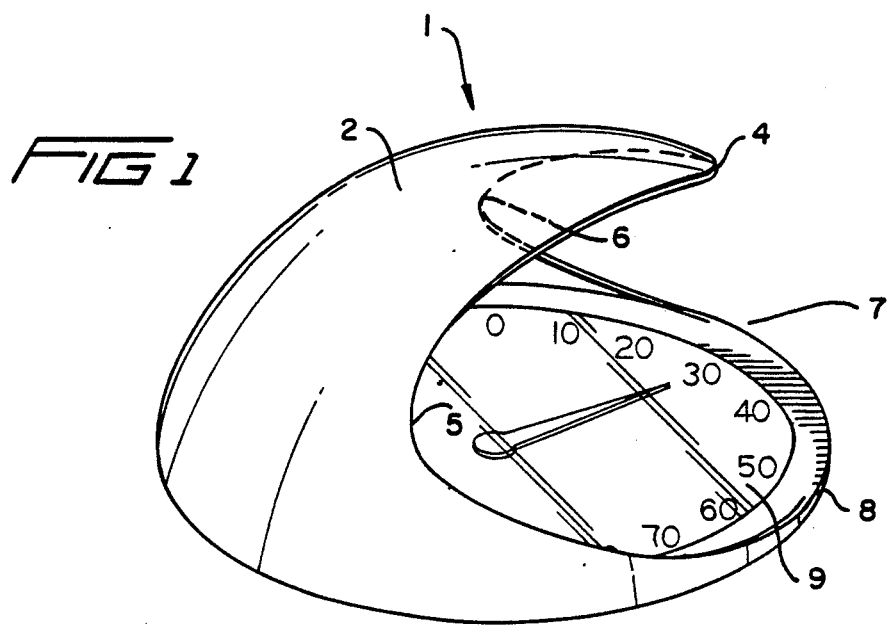
FIG. 1 is a perspective view of a device made in accordance with this invention.
Figure 2:
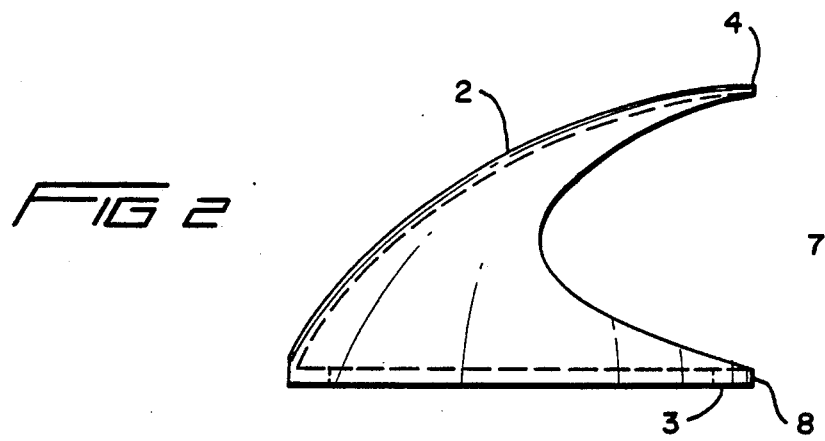
FIG. 2 is a view from one side of the device.
Figure 3:
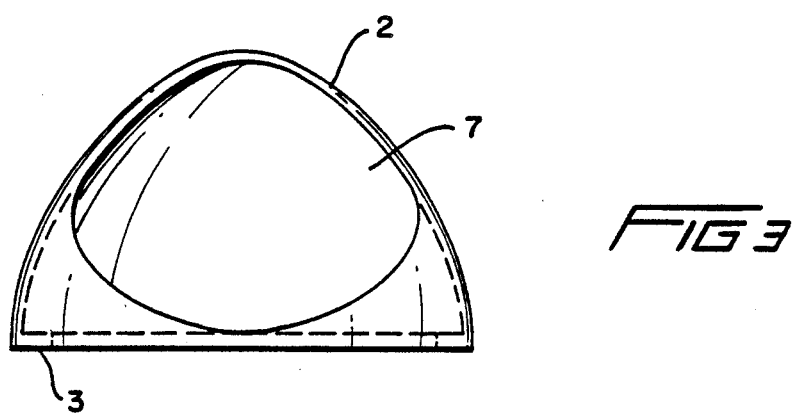
FIG. 3 is a view from the open end of the device.

FIGS. 1 through 3 show one embodiment of the invention mounted on an instrument panel to cover one instrument. The training device is mounted so that the instrument cannot be seen from its lefthand side but can be viewed from the right. If the pilot is sitting at the left, he must operate the aircraft without the aid of that instrument, although all the other instruments may be seen by him. However, a person, such as an instructor, sitting on the righthand side, is able to see the covered instrument to ensure that corrective action is taken if the pilot makes a mistake.

Training device 1 comprises a dome-like upper surface 2 secured to an annular base which is affixed to an instrument panel. The base is of a shape which will fit over the instrument 9, typically is round or elliptical, and is sized to fit over the instrument it is to obscure. Means, not shown, are provided at the base for temporarily securing the device to the instrument panel. The dome 2 is provided with opening 7 which is sufficiently large and appropriately placed to permit ready viewing of the entire instrument from the side faced by the opening while obscuring all portions of the instrument from the opposite side.

The dome may be in a variety of shapes and may include one or more plane surfaces. However, the preferred shape is in the form of a section of an ellipsoid such as a hemispheroid, including oblate spheroids and hemispheres, and the most preferred shape is approximately a quadrasection of a spheroid.

Some dome shapes, such as a section of a sphere, are easy to fabricate and an opening can easily be formed by cutting the surface on a plane which intersects the dome. However, such a configuration does not shield an instrument from as great an angle as other shapes such as that shown in the Figures. The preferred shape for the dome is one wherein an upper portion of the shielding surface extends to a point directly above the circumference of the base. See, for example, the embodiment shown in the Figures wherein upper point of lip 4 is almost vertically above a point on the circumference of the base. This configuration combines excellent viewability of the instrument from one side, i.e., the right side as shown in FIGS. 1 and 2, while obscuring the instrument from a position directly above the instrument to all positions at the lefthand side as shown. Preferably, the vertical distance from the lip 4 to the base is from about 70 percent to about 100 percent of the radius of the base, and most preferably is from about 75 percent to about 90 percent of the radius of the base.

While the line formed by the edges of the opening may be on a plane such as would produce an edge having the shape of an ellipse or a circle, in a preferred embodiment, the opening is constructed to provide a greater angle for viewing an instrument from one side. This may be accomplished by undercutting such as to points 5 and 6, shown in the Figures. In the preferred embodiment, a straight line drawn from point 5 to point 6 would pass through a point almost vertically above the center of the base. An opening of this shape makes the instrument easily visible to the person sitting on the righthand side, while that portion of the dome which extends to lip 4 obscures the instrument from the person sitting on the lefthand side.

The opening is preferably of a size and shape whereby the horizontal projection of the open area, for example, the area of a horizontal projection of the curved line connecting points 4, 5, 6 and 8 of FIG. 1, is preferably greater than about 30 percent of the open area of the base 3, and is most preferably from about 35 to about 45 percent of that area.

The device may be made of a variety of materials which are either opaque or translucent, and is preferably made of a commercially available plastic.

The device may be affixed to the instrument panel by a variety of ways, such as, for example, by a pressure-sensitive adhesive, or by means of pins on the instrument panel to mate with matching holes in the base. In the preferred embodiment of the invention, the base is provided with soft rubber suction cups to attach it to an instrument panel.

A typical device constructed in accordance with this invention is made in accordance with the Figures from a plastic 3 millimeters in thickness. The base is about 7 centimeters in diameter and is attached to a curved surface formed as in the drawings and having a dimension of about 4.5 centimeters from the bottom of the base portion to the top of the curved surface.

What is claimed is:

1. A controlled visibility device for mounting on an instrument panel of an aircraft to control the vision of a pilot operating the aircraft and to simulate failure of one or more instruments, comprising:
    a substantially planar base having an open area and adapted to be mounted over an individual instrument on an aircraft instrument panel; and,
    a dome having a planar lower rim affixed to said base, said dome having an opening on a lateral side, said opening having a sufficiently large projected area to permit viewing substantially the entire inner circumferential portion of the base from a position adjacent the opening.

2. A controlled visibility device according to claim 1 wherein said dome is a section of an oblate spheroid.

3. A controlled visibility device according to claim 1 wherein said dome is a section of a sphere.

4. A controlled visibility device according to claim 1 wherein the projected area of said opening is from about 30 percent to about 45 percent of the open area within said base portion.

5. A controlled visibility device according to claim 1 wherein the projected area of said opening is from about 35 percent to about 40 percent of the open area within said base.

6. A controlled visibility device according to claim 1 wherein the distance from the uppermost portion of the dome to the plane of the base is from about 75 percent to about 90 percent of the length of the radius of said base.

* * * * *